2,729,670

Patented Jan. 3, 1956

2,729,670

MANUFACTURE OF ACRYLONITRILE

Paulus H. De Bruin, Geleen, Netherlands, assignor to Stamicarbon N. V., Heerlen, Netherlands No Drawing. Application March 16, 1953,
Serial No. 342,725

Claims priority, application Netherlands April 10, 1952

8 Claims. (Cl. 260—465.9)

The present invention relates to the manufacture of acrylonitrile by dehydration of ethylene cyanohydrin according to the following reaction:

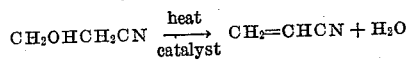

It is well known that the alkali metal salts of organic acids can be used as catalysts in dehydration procedures. These salts, particularly sodium formate, have also been recommended as catalysts in the production of acrylonitrile by the above mentioned dehydration of ethylene cyanohydrin.

However, the use of sodium formate as the dehydration catalyst, while desirable over other known dehydration catalysts in certain respects, presents a number of serious disadvantages. For instance, it is difficult to mix sodium formate with the ethylene cyanohydrin because the catalyst is a solid (melting point 253° C.) at the dehydration temperatures customarily employed, normally between 200° C. and 230° C., and possesses only very limited solubility in the cyanohydrin. As a result, when using sodium formate as catalyst, a doughy reaction mass is formed in which the ethylene cyanohydrin is difficult to distribute to form a homogeneous reaction mass. Furthermore, in the course of the dehydration with sodium formate, the doughy reaction mass swells and froths violently with the result that the desired dehydration has to be discontinued before optimum yields are obtained.

For the purpose of eliminating the above mentioned difficulties, potassium formate can be used as the catalyst instead of sodium formate since the potassium salt is a liquid (melting point 167° C.) at the dehydration temperatures and can be easily and thoroughly mixed with ethylene cyanohydrin. However, the use of potassium formate as the catalyst is undesirable because relatively low yields of acrylonitrile are obtained due to the fact that side reactions occur which cause the formation of undesired resinous products.

Accordingly, the principal object of the present invention is the provision of novel improvements in the production of acrylonitrile by dehydration of ethylene cyanohydrin whereby the above mentioned disadvantages are avoided.

Another object of the invention is the provision of novel procedures for rapidly and smoothly effecting dehydration of ethylene cyanohydrin using alkali metal formates as dehydration catalysts in such a way as to obtain high yields of acrylonitrile.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The foregoing objects are realized, according to the present invention, by carrying out the dehydration of the ethylene cyanohydrin, at a temperature below 250° C. using, as the dehydration catalyst, a mixture of alkali metal formates which is liquid at the dehydration temperature.

The success of the invention resides, at least to a substantial extent, in the finding that when using such a mixture of alkali-metal formates (for example, potassium and sodium formates), substantially no side reactions occur with the result that no resinous products are formed and high yields of over 90% of acrylonitrile are obtained. Furthermore, such mixture of alkali metal formates which is liquid at the reaction temperature avoids the necessity of working with a doughy catalytic mass and instead enables the formation of a homogeneous reaction mixture. This permits an easier transfer of heat through the reaction mixture with the result that the desired reaction temperature can be maintained without difficulty, even when operating continuously and using large charges of ethylene cyanohydrin.

For the formation of the catalyst according to the invention, any mixture of two or all of the alkali metal formates, i. e., sodium, potassium and lithium formates, can be utilized as long as this mixture is liquid at the dehydration temperature. For example, the addition of a small amount of potassium formate, for example 5%, by weight thereof, to sodium formate has been found sufficient to give a mixture which is liquid at reaction temperatures of below 250° C. and which is satisfactory as a dehydration catalyst according to the invention. Catalyst mixtures comprising substantially greater amounts of potassium and/or lithium formate than that stated above, for example 50 to 80% thereof and sodium formate are particularly desirable since, with such mixtures, it is possible to utilize a reaction temperature at which the ethylene cyanohydrin is liquid. In this connection, it is to be noted that the dehydration is preferably carried out at a temperature near the boiling point of the ethylene cyanohydrin (221° C.). However, lower dehydration temperatures, for example 200° C., or, if desired, temperatures below 250° C. at which the cyanohydrin is in the vapor phase, such as 235–245° C., may be used with advantage.

During the dehydration, the acrylonitrile and water which are formed as the dehydration products come off as vapors from the reaction mixture. These vapors are condensed and the desired acrylonitrile separated from the water. Preferably, the reaction mixture is refluxed in order to retain unreacted ethylene cyanohydrin in the reaction vessel.

The dehydration according to the invention can be carried out as a continuous or batch process although continuous operations wherein the ethylene cyanohydrin and catalytic mixture are continuously supplied to the reaction vessel, either separately or collectively, and the catalyst and reaction vapors continuously withdrawn from the vessel, are preferred. When carrying out the procedures of the invention in either batch or continuous fashion, it has been found that the yield of acrylonitrile can be further increased, and the life of the catalyst mixture made considerably longer if the dehydration is carried out in the presence of formic acid. More specifically, if dehydration is carried out by passing ethylene cyanohydrin into a mixture of alkali formates kept at the desired reaction temperature, it is found that about 75 mols of ethylene cyanohydrin can be dehydrated per 1 mol of catalyst (calculated on the basis of the mean molecular weight). In this way, a yield of over 90% can be obtained, but further addition of ethylene cyanohydrin beyond this point causes a decrease in the yield. In other words, the life of the catalyst, on a mol basis, is limited to the dehydration of about 75 mols of ethylene cyanohydrin. However, with the addition of a small amount of formic acid, either to the ethylene cyanohydrin or the catalytic mixture, the life of the catalytic mixture is so increased that about three times that amount of ethylene cyanohydrin (i. e., about 225 mols) can be dehydrated. Moreover, the formic acid effects an increase in the yield of acrylonitrile to over 95%.

The amount of formic acid to be added to the cyanohydrin or catalytic mixture for the purpose of extending the life of the catalyst and increasing the acrylonitrile yield can be widely varied. However, it need not exceed 4% by weight calculated on the ethylene cyanohydrin being dehydrated and preferably only from 0.5 to 3% of formic acid is added. The addition of these small amounts of formic acid does not lead to the neutralization of the condensed acrylonitrile-water mixture which, under the influence of the small amount of ammonia formed as a by-product in the dehydration always shows an alkaline reaction. The formic acid may be added to the reaction mixture as such or in the form of ammonium formate, which decomposes at the dehydration temperature with the formation of formic acid.

The proportions of ethylene cyanohydrin to catalyst used for effecting dehydration according to the invention can be widely varied with satisfactory results. Generally speaking, there may be used from 1 to 50 mols of ethylene cyanohydrin per hour per mol of catalyst although proportions outside this range and limited only by other operating conditions, for example, rate of heat transfer and the like, may also be satisfactorily used.

The invention is illustrated, but not limited by the following examples:

*Example 1*

In a 1 litre flask provided with a reflux cooler, 81 g. of a mixture comprising 20% by weight of sodium formate and 80% by weight of potassium formate were heated to a temperature of 200 to 210° C. at which temperature the mixture became liquid. At the above temperature ethylene cyanohydrin was slowly introduced into the catalyst mixture at the rate of 2 mols ethylene cyanohydrin per hour per mol of catalyst (the mean molecular weight of the catalyst is 80.8). No stirring of the reaction mixture was needed because the vapor bubbles rising through the liquid reaction mixture produced sufficient agitation.

The temperature in the upper part of the reflux cooler was maintained at about 90° C. The vapours, consisting of water vapour and acrylonitrile were condensed, and the condensate, which showed an alkaline reaction, was neutralized with sulphuric acid after which the acrylonitrile was separated therefrom in a distilling apparatus.

Over a period of ten hours, 98 g. of acrylonitrile were obtained per hour. This corresponds with a yield of 92% by weight based on the amount of ethylene cyanohydrin added.

*Example 2*

In the same manner as described in Example 1, a catalyst, composed of equal amounts by weight of potassium formate and sodium formate, was used at a reaction temperature of 220 to 223° C.

The ethylene cyanohydrin was supplied at the rate of 12.5 mol per hour per mol of catalyst. The yield of acrylonitrile obtained in a period of six hours amounted to 93% by weight, based on the amount of ethylene cyanohydrin added. It was found, however, that when the dehydration was continued the yield of acrylonitrile decreased. Similar results were obtained using a catalyst composed of equal amounts by weight of potassium formate and lithium formate.

The dehydration procedures described in the preceding paragraph were repeated after addition of 2% by weight of formic acid to the ethylene cyanohydrin. It was found that, as a result of the formic acid addition, the dehydration could be continued for substantially a longer period, a yield of 97% by weight of acrylonitrile being obtained in 15 hours.

*Example 3*

In the same manner as described in Example 1, a catalyst composed of 60% by weight of sodium formate and 40% by weight of potassium formate was utilized at a reaction temperature of from 202 to 205° C. As in Example 1, the ethylene cyanohydrin was introduced at the rate of 2 mols/mol of catalyst/hr.

The yield of acrylonitrile obtained in a period of ten hours amounted to 93% by weight based on the amount of ethylene cyanohydrin added.

*Example 4*

In the same manner as described in Example 1, a catalyst composed of equal amounts by weight of lithium formate and potassium formate was used at a reaction temperature of 219 to 225° C. The ethylene cyanohydrin, to which 1% by weight of formic acid had been added, was introduced at the rate of 14 mols of ethylene cyanohydrin per mol of catalyst per hour.

The yield of acrylonitrile obtained in a period of ten hours amounted to 98% based on the amount of ethylene cyanohydrin added.

When a catalyst composed of equal amounts by weight of lithium formate and sodium formate was used under the same conditions, a yield of 96% by weight of acrylonitrile was obtained in a period of ten hours.

The dehydration procedures described herein were repeated except that 1.8% by weight of ammonium formate was added to the ethylene cyanohydrin instead of formic acid. The yields of acrylonitrile amounted to 96% and 95% respectively.

While the invention has been described above with particular reference to specific embodiments, it is to be understood that same is not to be limited thereto but is instead to be construed broadly according to the scope of the appended claims.

I claim:

1. In the production of acrylonitrile by a process involving the dehydration of ethylene cyanohydrin at a temperature below 250° C. in the presence of an alkali metal formate catalyst, the improvement which comprises effecting the dehydration using, as the catalyst, a mixture of alkali metal formates which is liquid at the reaction temperature.

2. The production of acrylonitrile by a process involving the dehydration of ethylene cyanohydrin at a temperature below 250° C. in the presence of an alkali metal formate catalyst, the improvement which comprises effecting the dehydration in the presence of formic acid while using, as the catalyst, a mixture of alkali metal formates which is liquid at the reaction temperature.

3. The process of claim 2 wherein from 0.5 to 3% of formic acid is present, based on the weight of ethylene cyanohydrin.

4. In the production of acrylonitrile by a process involving the dehydration of ethylene cyanohydrin at a temperature below 250° C. in the presence of an alkali metal formate catalyst, the improvement which comprises effecting the dehydration in the presence of formic acid while using, as the catalyst, a mixture of alkali metal formates which is liquid at the reaction temperature, said formic acid being formed in situ by the addition to said ethylene cyanohydrin of an equivalent amount of ammonium formate which decomposes to form formic acid at the dehydration temperature.

5. The process of claim 1 wherein the dehydration is carried out at a temperature near the boiling point of the ethylene cyanohydrin.

6. The process of claim 5 wherein the catalyst comprises a mixture of sodium formate and from 50 to 80% by weight of at least one of the other alkali metal formates.

7. The process of claim 1 wherein the mixture of alkali metal formates comprises at least two formates from the group consisting of sodium, potassium and lithium formates.

8. The process of claim 1 wherein said mixture includes sodium formate as one of said formates.

References Cited in the file of this patent

UNITED STATES PATENTS

| | | |
|---|---|---|
| 2,389,607 | Britton et al. | Nov. 27, 1945 |
| 2,461,492 | Carpenter et al. | Feb. 8, 1949 |
| 2,494,116 | Carpenter | Jan. 10, 1950 |